United States Patent
Lai et al.

(10) Patent No.: US 7,534,007 B2
(45) Date of Patent: May 19, 2009

(54) BACKLIGHT MODULE

(75) Inventors: Ching-Kun Lai, Dacun Township, Changhua County (TW); Chung-Te Lee, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 11/136,222

(22) Filed: May 24, 2005

(65) Prior Publication Data
US 2006/0158905 A1    Jul. 20, 2006

(30) Foreign Application Priority Data
Jan. 19, 2005    (TW) .............................. 94101522 A

(51) Int. Cl.
*F21S 4/00*    (2006.01)

(52) U.S. Cl. ............ 362/224; 362/223; 362/240; 362/561; 362/632; 362/633; 362/634; 349/58; 349/69

(58) Field of Classification Search ............ 362/561, 362/217, 29, 84, 223–225, 240, 246, 247, 362/611, 632–634, 97; 349/58, 69
See application file for complete search history.

(56) References Cited

U.S. PATENT DOCUMENTS

| | | | |
|---|---|---|---|
| 6,722,773 B2 * | 4/2004 | Tsai et al. ............... 362/216 |
| 6,857,759 B2 | 2/2005 | Lee et al. | |
| 6,974,221 B2 * | 12/2005 | Wu et al. ............ 362/29 |
| 7,086,753 B2 * | 8/2006 | Lin et al. ............ 362/225 |
| 7,137,726 B2 * | 11/2006 | Lee et al. ............ 362/632 |
| 7,168,819 B2 * | 1/2007 | Yen ............ 362/29 |
| 2003/0227767 A1 * | 12/2003 | Lee et al. ............ 362/23 |
| 2004/0012763 A1 * | 1/2004 | Yu et al. ............ 353/122 |
| 2004/0257792 A1 * | 12/2004 | Yu et al. ............ 362/31 |
| 2005/0225960 A1 * | 10/2005 | Tsai ............ 362/23 |
| 2006/0050500 A1 * | 3/2006 | Chang et al. ............ 362/29 |

FOREIGN PATENT DOCUMENTS

| CN | 1467548 | 1/2004 |
|---|---|---|
| CN | 1567059 | 1/2005 |
| JP | 2004186080 | 7/2004 |

OTHER PUBLICATIONS

CN Office Action mailed May 30, 2008.
China Office Action mailed Sep. 22, 2006.

* cited by examiner

*Primary Examiner*—Sandra L. O'Shea
*Assistant Examiner*—Meghan K. Dunwiddie
(74) *Attorney, Agent, or Firm*—Thomas, Kayden, Hostemeyer & Risley

(57) ABSTRACT

A backlight module is disclosed. The backlight module includes a back plate, a diffuser and a supporter. The diffuser is disposed over the back plate. The supporter is disposed between the back plate and the diffuser and includes a seat and a fixing member. The fixing member has one or more protrusions formed thereon and the seat and fixing member are adapted to fix a light source.

11 Claims, 6 Drawing Sheets

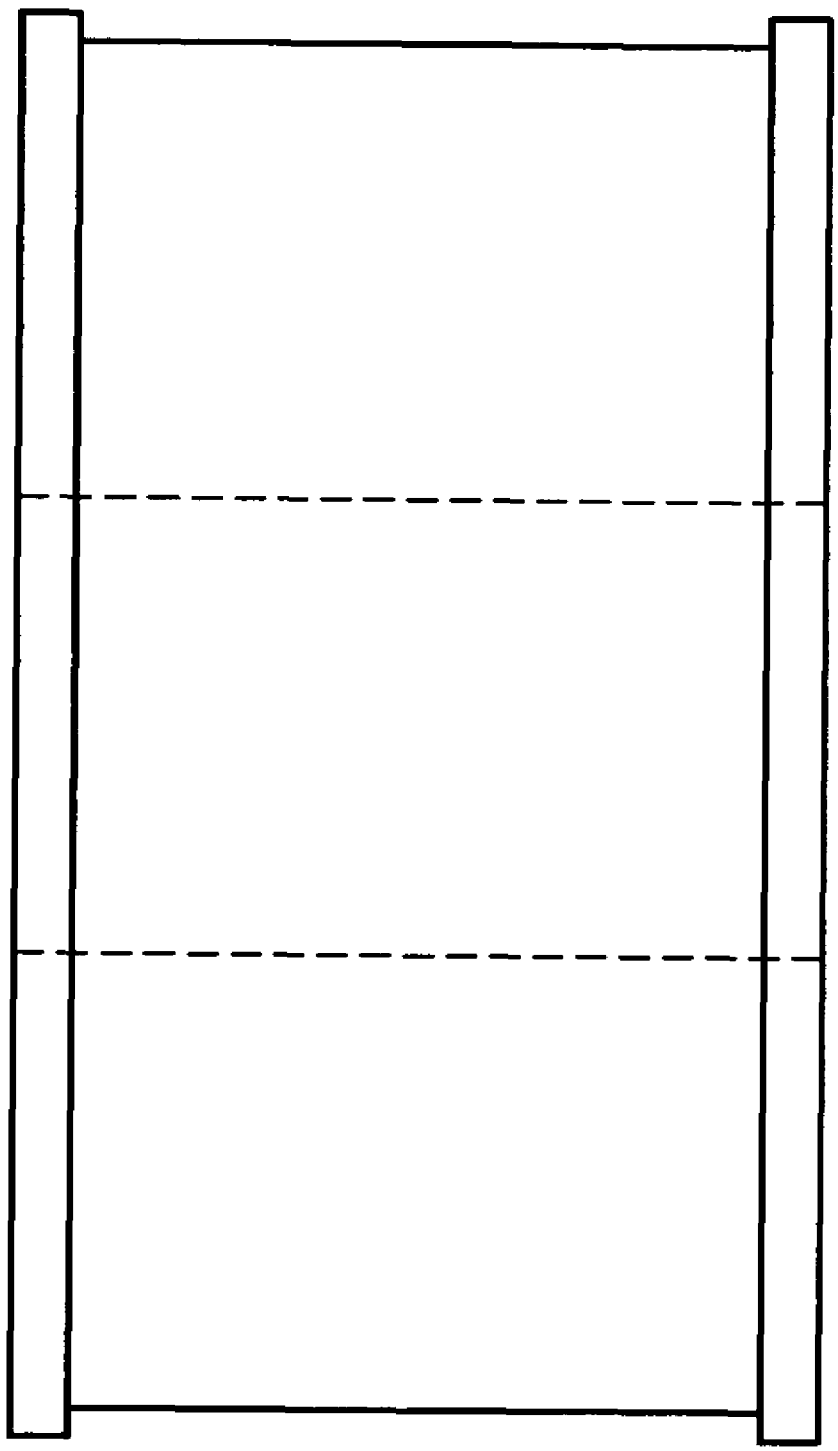

BACKLIGHT MODULE

The application claims the benefit of Taiwan application Ser. No. 94101522, filed Jan. 19, 2005, the subject matter of which is incorporated herein by reference.

BACKGROUND

The present invention relates to a backlight module, and more particularly, relates to a backlight module with supporters, maintaining spacing between the light source and the diffuser.

In a liquid crystal display (LCD) unit of a liquid crystal display, a backlight module is generally utilized as a light source. According to the structure, the backlight module can be an edge type or direct type module. Since the disclosure seeks to improve the direct type backlight module, a description of edge type backlight modules is omitted.

FIG. 1 is a cross-section of a conventional direct type backlight module. In FIG. 1, a direct type backlight module 10 includes a reflector 11, a diffuser 12, a plurality of supporters 13 and cold cathode fluorescent lamps 14. The reflector 11 is at the bottom of the direct type backlight module 10. The diffuser 12 is disposed on the reflector 11, and the fluorescent lamps 14 are disposed therebetween. The reflector 11 reflects the light provided by the fluorescent lamps 14, passing through the diffuser 12 as a light source for flat displays. The supporters 13 are disposed on the reflector 11 and abut the diffuser 12, protecting the diffuser 12 from deformation which may deteriorate optical characteristics of the backlight module 10.

Furthermore, the fluorescent lamps 14 in large backlight modules are long and thin, subject to damage during assembly or transport. Thus, the conventional backlight module 10 further comprises transparent O-rings 15 disposed manually on the fluorescent lamps 14 to provide support for the fluorescent lamps 14 and prevent excessive deformation. This assembly step, however, is inefficient, and the fluorescent lamps 14 easily crack during assembly, increasing costs of the finished modules.

SUMMARY

In order to address the disadvantages of the aforementioned backlight module, an embodiment of the present invention provides an easily assembled supporter for a direct type backlight module, securing the fluorescent lamps and maintaining spacing between the diffuser and the fluorescent lamps, protecting both from deformation.

An embodiment of the present invention provides a backlight module utilizing the abovementioned supporters.

Accordingly, an embodiment of the present invention provides a backlight module comprising a reflector, a diffuser, a plurality of supporters and fluorescent lamps disposed therebetween. The diffuser is disposed on the reflector. The supporter comprises a seat and a fixing member. The seat is disposed on the reflector. The fixing member is secured on the seat and comprises a protrusion abutting the diffuser, preventing deformation and maintaining spacing between the reflector and diffuser. The fluorescent lamps are fixed by the seat and fixing member, providing light required by the backlight module.

In the embodiment, the supporter is made of transparent material or white material. The seat has a first hook, and the first hook secures the seat to the reflector. The fixing member comprises a second hook, and the second hook secures the fixing member to the seat. The seat further has a plurality of holding portions, and the fixing member has a plurality of corresponding curved portions to fix the fluorescent lamps. The holding portions and the corresponding curved portions surround and fix the fluorescent lamps when the fixing member is secured on the seat. The protrusion is located between two adjacent curved portions of the fixing member, point contacting and supporting the diffuser.

Furthermore, between the fluorescent lamps and the curved portion of the fixing member is a gap. The reflector has multiple pieces, by which can minimize deformation of the reflector.

DESCRIPTION OF THE DRAWINGS

The invention can be more fully understood by reading the subsequent detailed description in conjunction with the examples and references made to the accompanying drawings, wherein:

FIG. 6 is a schematic view of a reflector in an embodiment of the present invention.

DETAILED DESCRIPTION

Figure 1:
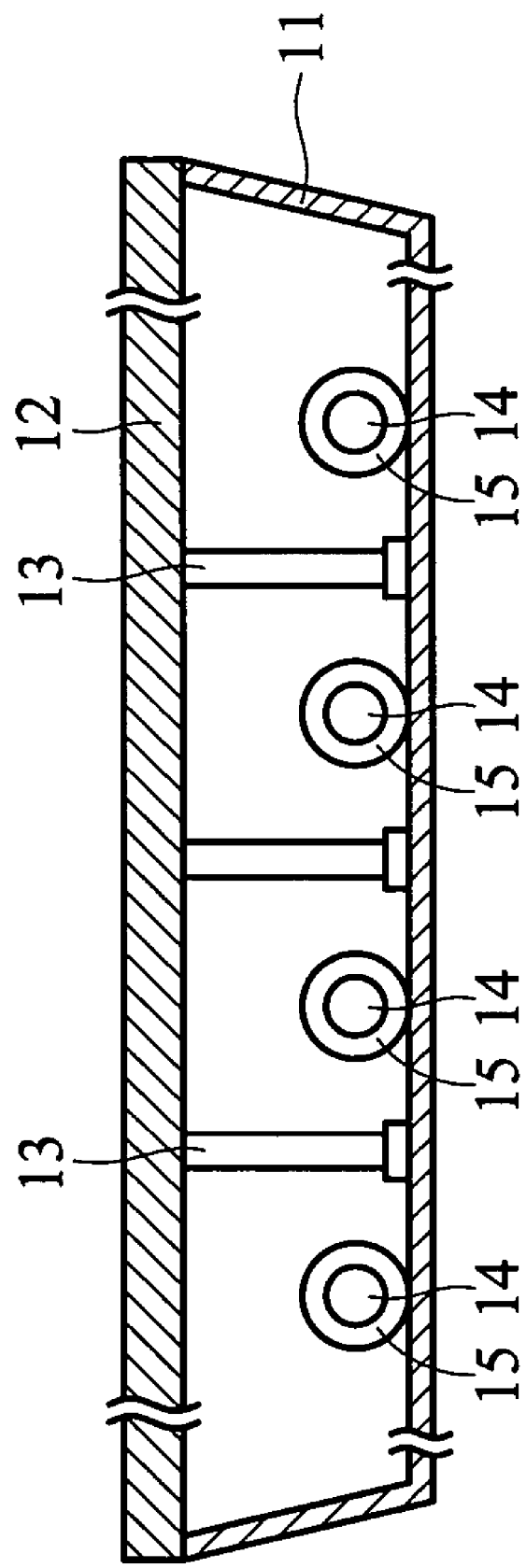
FIG. 1 is a cross-section of a conventional direct type backlight module.
Figure 2:
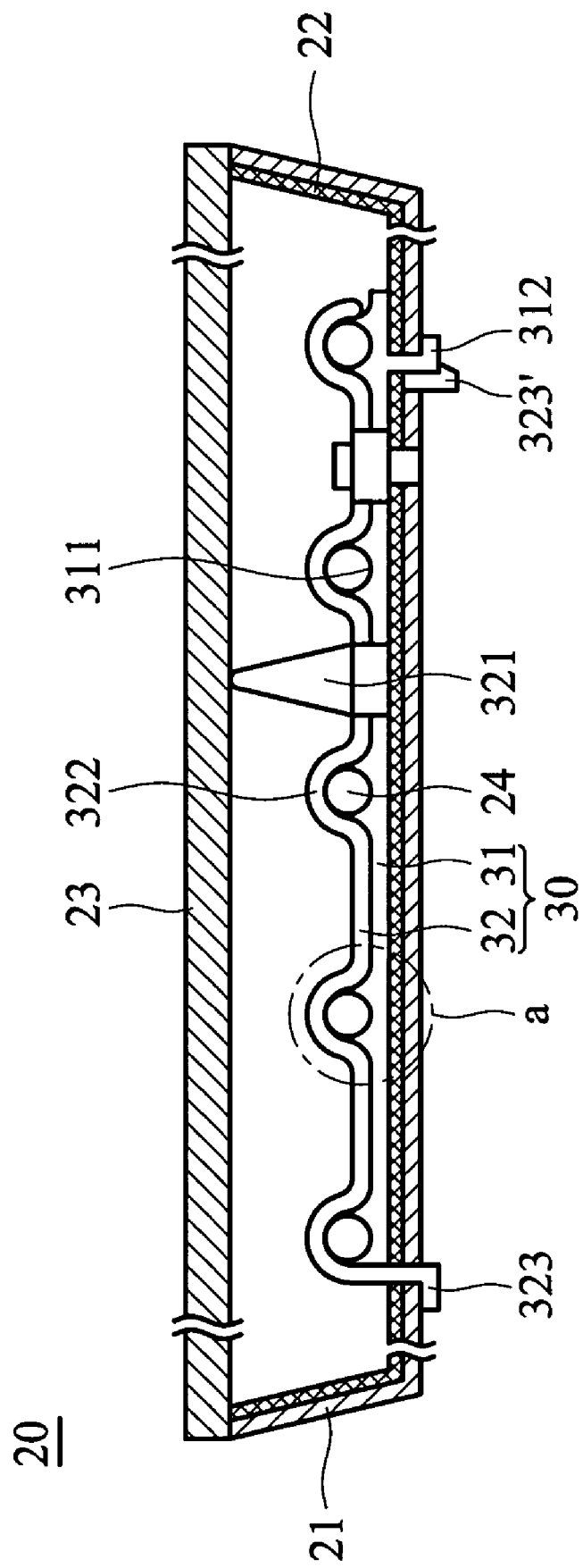
FIG. 2 is a cross-section of a direct type backlight module in an embodiment of the present invention.

FIG. 2 is a cross-section of a direct type backlight module in an embodiment of the present invention. In order to simplify the drawing, only five light sources 24 are shown although the disclosure is not limited thereto.

The backlight module 20 in an embodiment of the present invention comprises a back plate 21, a reflector 22, a diffuser 23, a plurality of light sources 24 (such as fluorescent lamp or the similarities) and supporters 30. The reflector 22 is disposed on the back plate 21 to reflect light. The diffuser 23 is disposed above the reflector 22, defining an inner space by the reflector 22 and the diffuser 23. The supporters 30 are disposed between the reflector 22 and the diffuser 23 and comprise a seat 31 and a fixing member 32. The light sources 24 are separately fixed with the same spacing by the seat 31 and fixing member 32, providing light required by backlight module 20. The seat 31 is disposed on the reflector 22. The fixing member 32 is secured on the seat 31 and comprises a protrusion 321 abutting the diffuser 23, maintaining the inner space between the reflector 22 and diffuser 23.

In FIG. 2, the supporter 30 is made of transparent material or white material. The seat 31 of the supporter 30 comprises a plurality of holding portions 311. The fixing member 32 comprises a plurality of curved portions 322 corresponding to the holding portions 311. The seat 31 or fixing member 32 are integral and formed by plastic molding injection. The seat 31 is fixed on the reflector 22 and the back plate 21 by a first hook 312. The light sources 24 are separately arranged on the holding portions 311 of the seat 31. The fixing member 32 is then fixed on the seat 31 by second hooks 323 and 323'. Thus, the holding portions 311 of the seat 31 and the curved portions 322 of the fixing member 32 surround and secure the light sources 24 of the backlight module 20. It is noted that a gap between parallel sections of the seat 31 and the fixing member 32 is substantially in a range of about 0 mm to about 1 mm after the seat 31 and the fixing member 32 are assembled.

Figure 3:
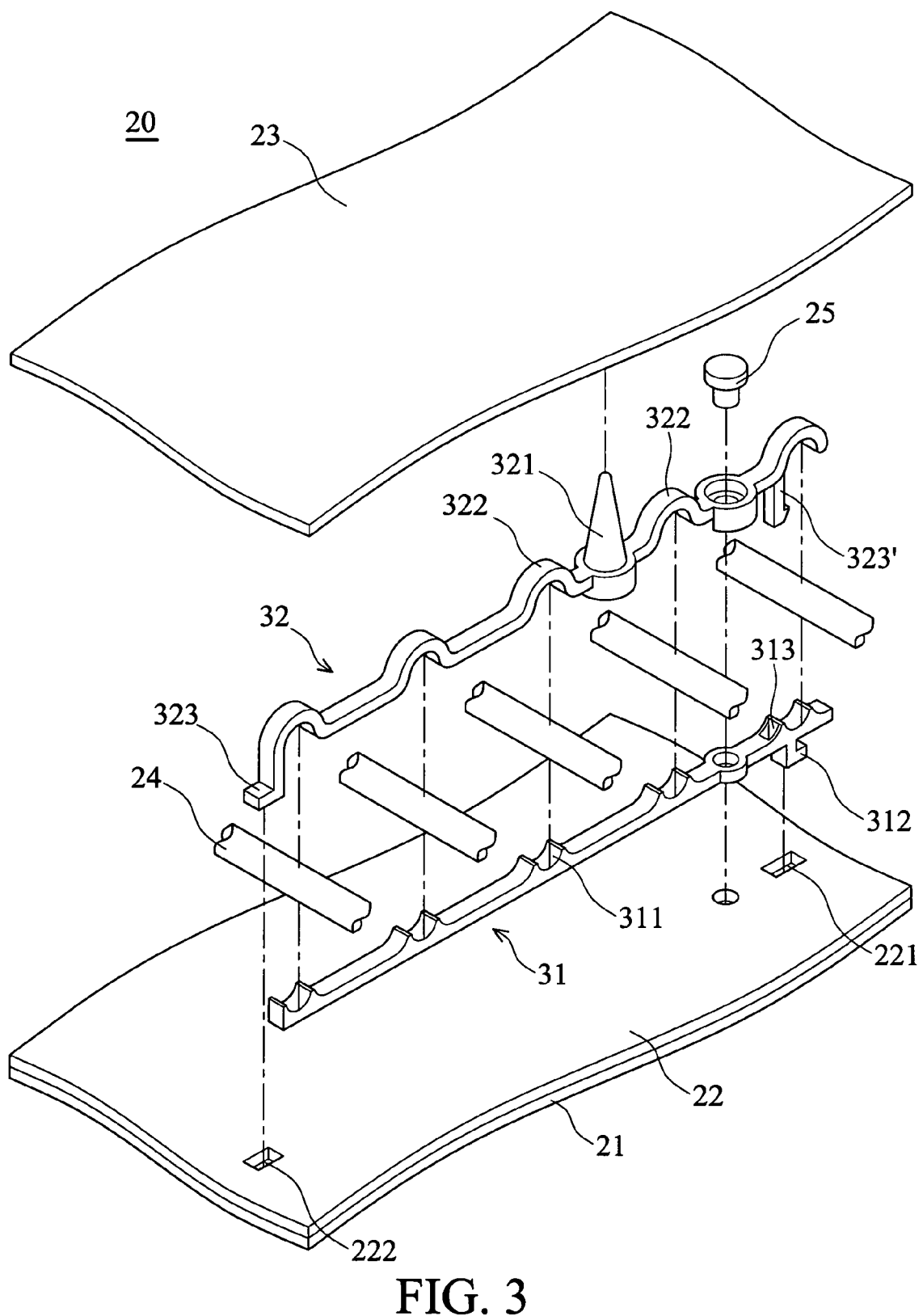
FIG. 3 is a partial exploded perspective view of the direct type backlight module in FIG. 2.

FIG. 3 is a partial exploded perspective view of the direct type backlight module in FIG. 2. In order to simplify the drawing, FIG. 3 shows only a supporter 30 and part of the reflector 22 and diffuser 23. Referring to FIGS. 2 and 3, during assembly of the backlight module 20 of this embodiment of the present invention, the seat 31 is first disposed on the reflector 22 with the first hook 312 passing through a hole 221. The light sources 24 are separately disposed on the holding portions 311 and perpendicular to the seat 31, providing proper support for the middle of the light sources 24. After the arrangement of the light sources 24, the second hook 323 of the fixing member 32 is inserted into the hole 222, engaging the left side of the fixing member 32 with the back plate 21 and the reflector 22. The second hook 323' at the other side of the fixing member 32 then passes a hole 313 on the back plate 21 and a hole on the reflector 22, such that the fixing member 32 is secured on the seat 31. The holding portions 311 of the seat 31 and the curved portions 322 of the fixing member 32 surround and secure the light sources 24 of the backlight module 20, protecting the light sources 24 from damages. Finally, the diffuser 23 is disposed above the reflector 22, thus finishing assembly of the direct type backlight module 20 of this embodiment.

The protrusion 321 is located between two adjacent curved portions of the fixing member 32, point contacting and supporting the diffuser 23. Thus, the predetermined inner space is maintained between the reflector 22 and the diffuser 23.

Furthermore, to fix the supporter 30 on the reflector 22, adhesive is applied on the bottom of the seat 31, or the seat 31 and fixing member 32 is fixed on the reflector 22 by a screw 25 as shown in FIG. 3.

Figure 4:
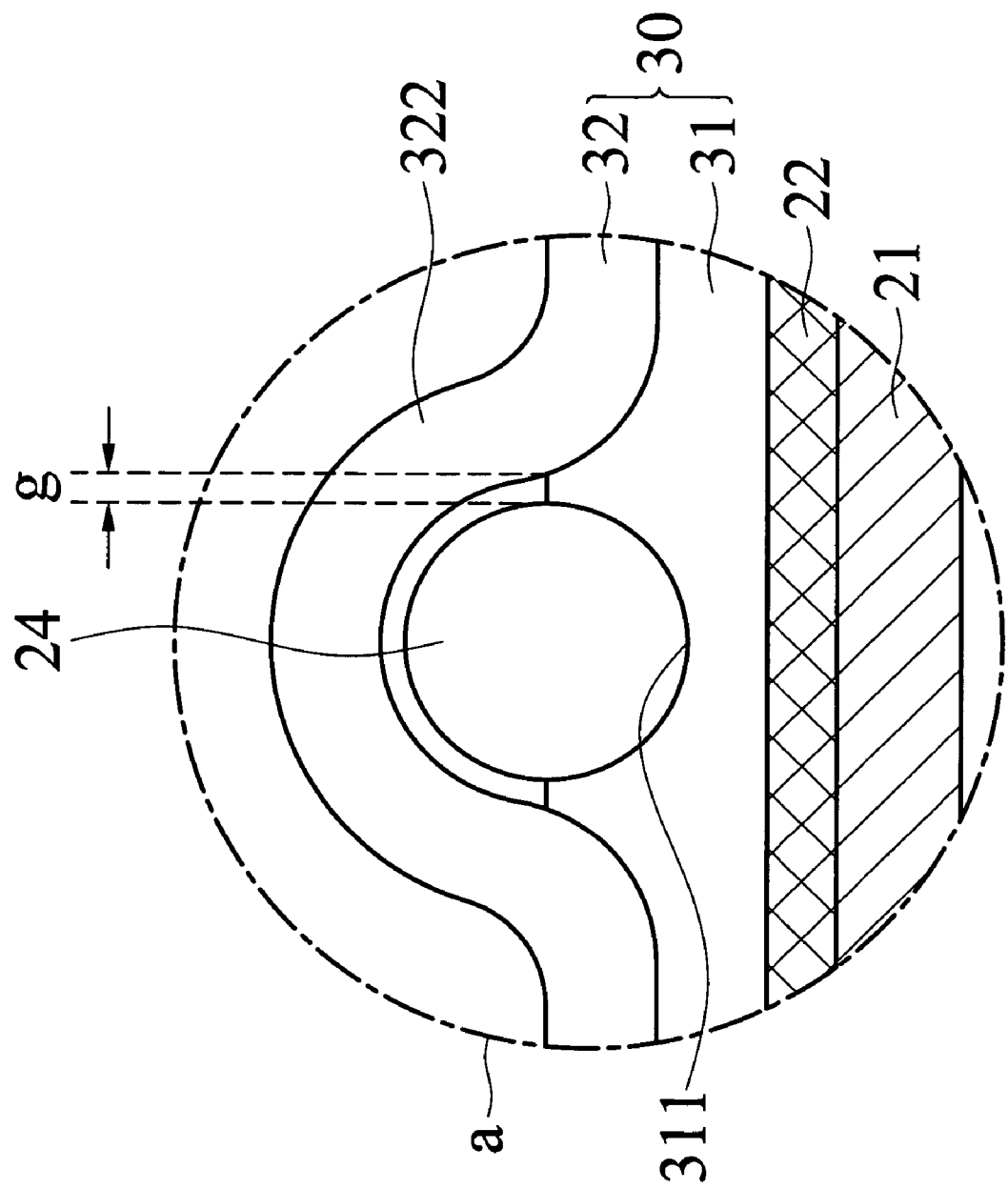
FIG. 4 is a schematic view of the enlarged area a in FIG. 2.

FIG. 4 shows the enlarged area a in FIG. 2. In FIG. 4, there is a gap g between the fluorescent tube and the curved portion of the fixing member 32, which provides buffer space for heat expansion of the light sources 24.

Figure 5:
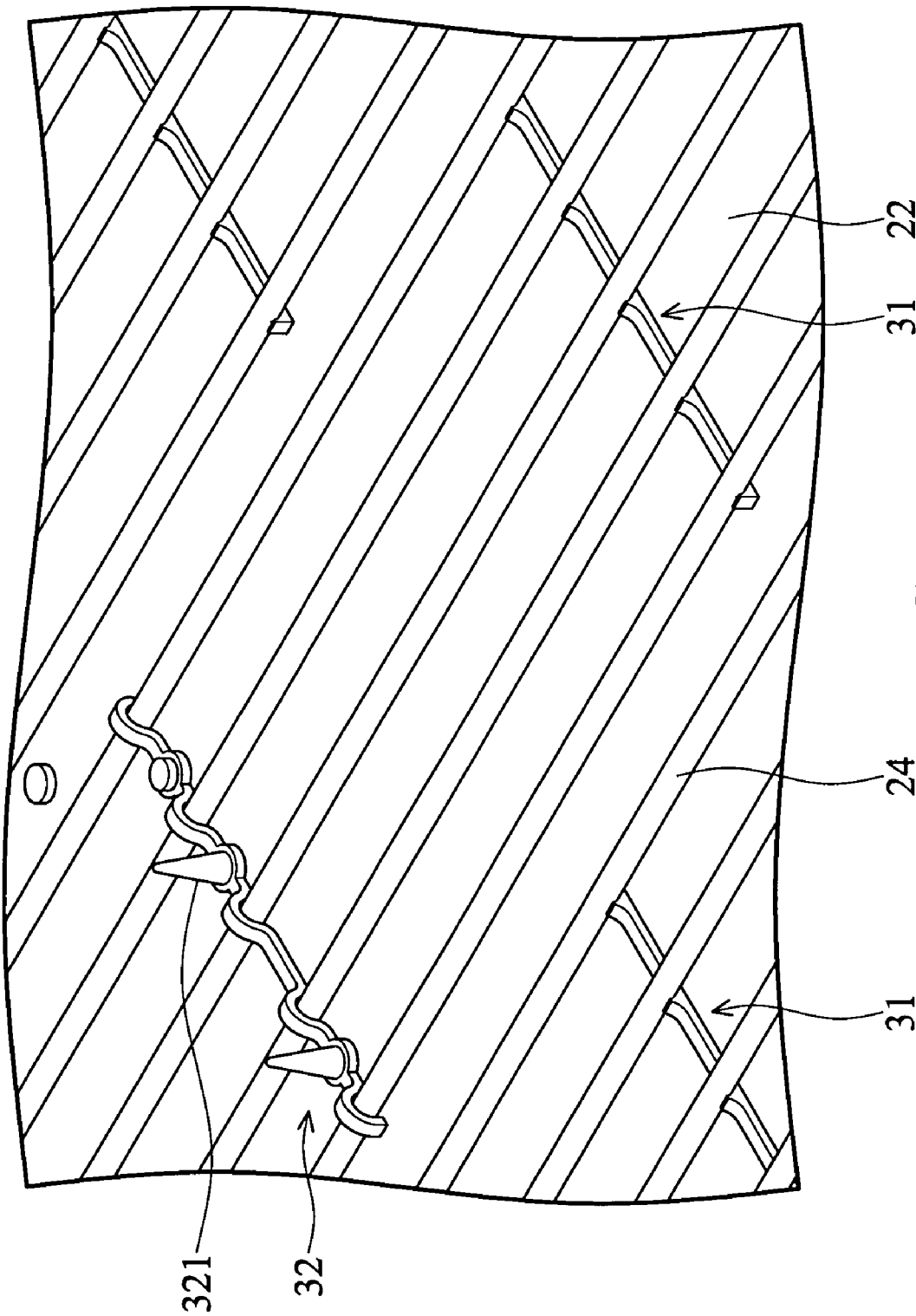
FIG. 5 is a schematic view of a direct type backlight module in another embodiment of the present invention.

FIG. 5 is another schematic view of a direct type backlight module 20 in another embodiment of the present invention. In FIG. 5, the supporters are separately utilized. The seat 31 and the fixing member 32 are separately disposed on the reflector 22. For example, the seat 31 is disposed depart from the fixing member 32 a distance or the seat 31 is near the fixing member 32. The light sources 24 are arranged on the holding portions 331 of the seat and the diffuser 23 are supported by the protrusion 321 of the fixing member.

Furthermore, the reflector 22 can be divided into multiple pieces to minimize deformation thereof and reduce cost.

Accordingly, the supporters utilized by the direct type backlight module of the invention are divided into two parts, such that the assembly steps can be simplified. Furthermore, the protrusions of the supporters provide proper support for the diffuser, preventing downward deformation by gravity which deteriorates lamination uniformity of the backlight module.

While the present invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A backlight module, comprising:
a back plate;
a diffuser disposed over the back plate; and
a supporter, disposed between the back plate and the diffuser, comprising a seat and a fixing member, wherein the seat comprises a first hook and is secured on the back plate by the first hook, the fixing member has one or more protrusions formed thereon and the seat and the fixing member are adapted to fix a light source;
wherein the seat comprises a plurality of holding portions, and the fixing member disposed on the seat comprises a plurality of corresponding curved portions;
wherein the one or more protrusions are formed between two adjacent curved portions of the fixing member.

2. The backlight module of claim 1, wherein the fixing member comprises a second hook and is secured on the back plate by the second hook.

3. The backlight module of claim 1, wherein the holding portions and the corresponding curved portions are adapted to fix the light source.

4. The backlight module of claim 1, wherein the seat comprises a plurality of holding portions, the fixing member comprises a plurality of corresponding curved portions, and the seat and the fixing member are separately disposed under the diffuser.

5. The backlight module of claim 1, wherein the light source is spaced apart from the curved portion of the fixing member.

6. The backlight module of claim 1, wherein the supporter is made of transparent material or white material.

7. The backlight module of claim 1, further comprising a reflector, disposed on the back plate and having a plurality of pieces.

8. A supporter for a backlight module, the backlight module having a diffuser, comprising:
a seat comprising a plurality of holding portions; and
a fixing member comprising a protrusion and a plurality of curved portions, and a flat portion located between each two of the adjacent the curved portions, and the flat portion comprises a top surface substantially parallel to a bottom surface of the diffuser:
wherein the seat comprises a plurality of holding portions, and the fixing member disposed on the seat comprises a plurality of corresponding curved portions: wherein the protrusion is formed between two adjacent curved portions of the fixing member.

9. The supporter of claim 8, wherein the protrusion is formed between two adjacent curved portions of the fixing member.

10. The supporter of claim 8, wherein the supporter is made of transparent material or white material.

11. A supporter for a backlight module, the backlight module having a back plate, comprising:
a seat comprising a plurality of holding portions and a first hook and secured on the back plate by the first hook; and
a fixing member comprising a protrusion and a plurality of curved portions;
wherein the seat comprises a plurality of holding portions. and the fixing member disposed on the seat comprises a plurality of corresponding curved portions; wherein the protrusion is formed between two adjacent curved portions of the fixing member.

* * * * *